United States Patent
Tsuchiya et al.

(10) Patent No.: US 6,366,854 B1
(45) Date of Patent: Apr. 2, 2002

(54) METHOD AND APPARATUS FOR MEASURING DISPLACEMENT OF OBJECT USING GPS

(75) Inventors: Atsushi Tsuchiya, Kamakura; Teruyuki Kato, Fujisawa; Yukihiro Terada, Osaka; Masao Kinoshita, Osaka; Hideshi Kakimoto, Osaka; Hiroshi Isshiki, Osaka, all of (JP)

(73) Assignee: Hitachi Zosen Corporation, Osaka (JP)

( * ) Notice: Subject to any disclaimer, the term of this patent is extended or adjusted under 35 U.S.C. 154(b) by 0 days.

(21) Appl. No.: 09/597,109

(22) Filed: Jun. 20, 2000

(30) Foreign Application Priority Data

Nov. 24, 1999 (JP) .......................................... 11-332126

(51) Int. Cl.$^7$ ................................................ G01S 5/14
(52) U.S. Cl. .................. 701/213; 701/215; 342/357.06; 342/357.12
(58) Field of Search ................................. 701/213, 214, 701/215; 342/357.01, 357.06, 357.07, 357.08, 357.11, 357.12

(56) References Cited

U.S. PATENT DOCUMENTS

| | | | | |
|---|---|---|---|---|
| 5,119,341 A | * | 6/1992 | Youngberg | ...................... 367/5 |
| 5,467,282 A | * | 11/1995 | Dennis | ........................ 701/207 |
| 5,933,110 A | * | 8/1999 | Tang et al. | ............. 342/357.11 |

* cited by examiner

Primary Examiner—Tan Nguyen
(74) Attorney, Agent, or Firm—Fildes & Outland, P.C

(57) ABSTRACT

The present invention is a method for measuring a distance between a GPS receiver installed in a floating body and a GPS satellite, subjecting this measured distance data to a moving averaging process, removing from the measured distance data, distance data corresponding to a distance to a satellite orbit to determine a variance of the GPS receiver, removing wind wave-induced noise from the data, then determining three linear equations that use three-dimensional coordinates of the GPS receiver as unknown numbers, based on variances relative to GPS satellites and an azimuth and an elevation of each GPS satellite, and then solving these simultaneous equations to determine displacement of the GPS receiver corresponding to its variation component quantities on three-dimensional coordinate axes.

20 Claims, 13 Drawing Sheets

METHOD AND APPARATUS FOR MEASURING DISPLACEMENT OF OBJECT USING GPS

FIELD OF THE INVENTION

The present invention relates to a displacement measuring method and apparatus that install a GPS receiver in, for example, a floating body floating on the sea surface to detect the position of this floating body in order to measure displacement of the floating body, that is, variations in waves.

BACKGROUND OF THE INVENTION

The kinematic positioning uses a GPS (Global Positioning System) to precisely measure the position of a receiver of the system (precisely speaking, the position of a receive antenna).

The kinematic positioning installs a receiver on a known point as a reference point while allowing another receiver to move on an unknown point, to determine a relative position between the reference point and the moving receiver, that is, a baseline vector in order to precisely measure variation components of this baseline vector.

Thus, the kinematic positioning requires the reference point. If the baseline vector is elongated, this method also requires a large amount of analysis data to be transmitted to maintain precision in measuring the baseline vector, thereby increasing technical and economical burdens.

DISCLOSURE OF THE INVENTION

It is thus an object of the present invention to provide a method and apparatus for measuring displacement of an object using a GPS, wherein the displacement of the object can be measured precisely without the needs for a reference point.

To attain this object, a method for measuring displacement of an object using a GPS according to the present invention is characterized by operating in measuring displacement of an object with a GPS receiver installed thereon, to measure a distance between the GPS receiver and a GPS satellite, then remove from this measured distance data, distance data corresponding to a distance to a satellite orbit to determine a variance of the GPS receiver, then determine at least three linear equations that use three-dimensional coordinates of the GPS receiver as unknown numbers, based on the variances relative to at least three GPS satellites and an azimuth and an elevation of each GPS satellite, and then solve these simultaneous equations to determine displacement of the GPS receiver corresponding to its variation component quantities on three-dimensional coordinate axes.

In addition, according to a preferred embodiment of the present invention, in the method for measuring displacement of an object, the distance data corresponding to the distance to the satellite orbit is obtained by subjecting the measured distance data to a moving averaging process, or as the distance data corresponding to the distance to the satellite orbit, satellite orbit data itself is used.

Furthermore, according to another preferred embodiment of the present invention, in the method for measuring displacement of an object, the variance of the GPS receiver is obtained by passing the measured distance data through a high pass filter to remove distance data approximate to the satellite orbit or subjecting the measured distance data to a moving averaging process based on a time window larger than or equal to a variation cycle in a measurement environment.

With the above configuration, the variances of the GPS receiver relative to the at least three GPS satellites are determined based on the measured distance data between the GPS receiver and the GPS satellites and the at least three linear equations are determined based on these variances and the azimuth and elevation of each GPS satellite so that these simultaneous equations are solved to determine the variance of the GPS receiver on the three-dimensional coordinate axes. Thus, this configuration requires no reference point in contrast to the kinematic positioning and does not require a large amount of measured data to be transmitted to the land reference point for analysis with data in the reference point. Consequently, measurement costs can be reduced and the displacement of the object can be measured precisely.

In addition, to attain the above object, the method for measuring displacement of an object using a GPS according to the present invention is characterized by operating in measuring displacement of an object with a GPS receiver installed thereon, to measure a distance between the GPS receiver and a GPS satellite, then remove from this measured distance data, distance data corresponding to a distance to a satellite orbit to determine a variance of the GPS receiver, then determine at least four linear equations that use three-dimensional coordinates of the GPS receiver as unknown numbers, based on the variances relative to at least four GPS satellites and an azimuth and an elevation of each GPS satellite, then determine differences among the at least four linear equations to obtain linear equations for at least three satellite to satellite single phase differences concerning the variance of the GPS receiver, and then solve these simultaneous equations to determine displacement of the GPS receiver corresponding to its variation component quantities on three-dimensional coordinate axes.

In addition, according to a preferred embodiment of the present invention, in the method for measuring displacement of an object, the distance data corresponding to the distance to the satellite orbit is obtained by subjecting the measured distance data to a moving averaging process, or as the distance data corresponding to the distance to the satellite orbit, satellite orbit data itself is used.

Furthermore, according to another preferred embodiment of the present invention, in the method for measuring displacement of an object, the variance of the GPS receiver is obtained by passing the measured distance data through a high pass filter to remove therefrom distance data approximate to the satellite orbit or subjecting the measured distance data to a moving averaging process based on a time window larger than or equal to a variation cycle in a measurement environment.

With the above configuration, the variance of the GPS receiver relative to the at least four GPS satellites is determined based on the measured distance data between the GPS receiver and the GPS satellites and the linear equations for the at least three satellite to satellite single phase differences are determined based on the above variances and the azimuth and elevation of each GPS satellite so that these simultaneous equations are solved to determine the variance of the GPS receiver on the three-dimensional coordinate axes. Thus, this configuration requires no reference point in contrast to the kinematic positioning and does not require a large amount of measured data to be transmitted to the land reference point for analysis with data in the reference point. Consequently, measurement costs can be reduced and the displacement of the object can be measured precisely.

To attain the above object, an apparatus for measuring displacement of an object using a GPS according to the present invention, the apparatus measuring displacement of an object with a GPS receiver installed thereon, the apparatus being characterized by comprising a distance measuring section provided in the GPS receiver for measuring distances between the GPS receiver and a GPS satellite, a variance detecting section for removing from measured distance data measured by the distance measuring section, distance data corresponding to a distance to a satellite orbit to determine a variance of the GPS receiver, and a displacement calculating section for determining at least three linear equations that use three-dimensional coordinates of the GPS receiver as unknown numbers, based on variances relative to at least three GPS satellites determined by the variance detecting section and on an azimuth and an elevation of each GPS satellite and then solving these simultaneous equations to determine displacement of the GPS receiver corresponding to its variation component quantities on three-dimensional coordinate axes.

In addition, according to a preferred embodiment of the present invention, in the apparatus for measuring displacement of an object, the distance data corresponding to the distance to the satellite orbit is obtained by subjecting the measured distance data to a moving averaging process, or as the distance data corresponding to the distance to the satellite orbit, satellite orbit data itself is used.

Furthermore, according to another preferred embodiment of the present invention, in the apparatus for measuring displacement of an object, the variance of the GPS receiver is obtained by passing the measured distance data through a high pass filter to remove therefrom distance data approximate to the satellite orbit or subjecting the measured distance data to a moving averaging process based on a time window larger than or equal to a variation cycle in a measurement environment.

With the above configuration, the variances of the GPS receiver relative to the at least three GPS satellites are determined based on the measured distance data between the GPS receiver and the GPS satellites and the at least three linear equations are determined based on these variances and the azimuth and elevation of each GPS satellite so that these simultaneous equations are solved to determine the variance of the GPS receiver on the three-dimensional coordinate axes. Thus, this configuration requires no reference point in contrast to the kinematic positioning and does not require a large amount of measured data to be transmitted to the land reference point for analysis with data in the reference point. Consequently, measurement costs can be reduced and the displacement of the object can be measured precisely.

To attain the above object, the apparatus for measuring displacement of an object using a GPS according to the present invention, the apparatus measuring displacement of an object with a GPS receiver installed thereon, the apparatus being characterized by comprising a distance measuring section provided in the GPS receiver for measuring distances between the GPS receiver and a GPS satellite, a variance detecting section for removing from measured distance data measured by the distance measuring section, distance data corresponding to a distances to a satellite orbit to determine a variance of the GPS receiver, and a displacement calculating section for determining at least four linear equations that use three-dimensional coordinates of the GPS receiver as unknown numbers, based on variances relative to at least four GPS satellites determined by the variance detecting section and on an azimuth and an elevation of each GPS satellite, determining differences among the at least four linear equations to obtain linear equations for at least three satellite to satellite single phase differences concerning the variance of the GPS receiver, and then solving these simultaneous equations to determine displacement of the GPS receiver corresponding to its variation component quantities on three-dimensional coordinate axes.

With the above configuration, the variances of the GPS receiver relative to the at least four GPS satellites are determined based on the measured distance data between the GPS receiver and the GPS satellites and the linear equations for the at least three satellite to satellite single phase differences are determined based on the above variances and the azimuth and elevation of each GPS satellite so that these simultaneous equations are solved to determine the variance of the GPS receiver on the three-dimensional coordinate axes. Thus, this configuration requires no reference point in contrast to the kinematic positioning and does not require a large amount of measured data to be transmitted to the land reference point for analysis with data in the reference point. Consequently, measurement costs can be reduced and the displacement of the object can be measured precisely.

In addition, according to a preferred embodiment of the present invention, in the apparatus for measuring displacement of an object, the distance data corresponding to the distance to the satellite orbit is obtained by subjecting the measured distance data to a moving averaging process, or as the distance data corresponding to the distance to the satellite orbit, satellite orbit data itself is used.

Furthermore, according to another preferred embodiment of the present invention, in the apparatus for measuring displacement of an object, the variance of the GPS receiver is obtained by passing the measured distance data through a high pass filter to remove therefrom distance data approximate to the satellite orbit or subjecting the measured distance data to a moving averaging process based on a time window larger than or equal to a variation cycle in a measurement environment.

With the above configuration, the variances of the GPS receiver relative to the at least four GPS satellites are determined based on the measured distance data between the GPS receiver and the GPS satellites and the linear equations for the at least three satellite to satellite single phase differences are determined based on the above variances and the azimuth and elevation of each GPS satellite so that these simultaneous equations are solved to determine the variance of the GPS receiver on the three-dimensional coordinate axes. Thus, this configuration requires no reference point in contrast to the kinematic positioning and does not require a large amount of measured data to be transmitted to the land reference point for analysis with data in the reference point. Consequently, measurement costs can be reduced and the displacement of the object can be measured precisely.

Various features and effects of the present invention will be apparent from embodiments, which will be described based on accompanying drawings.

DESCRIPTION OF THE EMBODIMENTS

The description of embodiments focuses on detection of a tsunami, high seas or the like based on measurement of displacement of a floating body (an object) such as a buoy which floats on the sea surface (including the water surface), using a GPS receiver installed in the floating body. The present invention is not based on relative positioning but on single-point positioning; precisely speaking, this positioning is referred to as Point precise Variance Detection (PVD) based on one-way carrier phases from a single GPS receiver.

FIGS. 1 to 6 are useful in explaining a method and apparatus for measuring displacement of an object using a GPS according to a first embodiment of the present invention.

Figure 1:
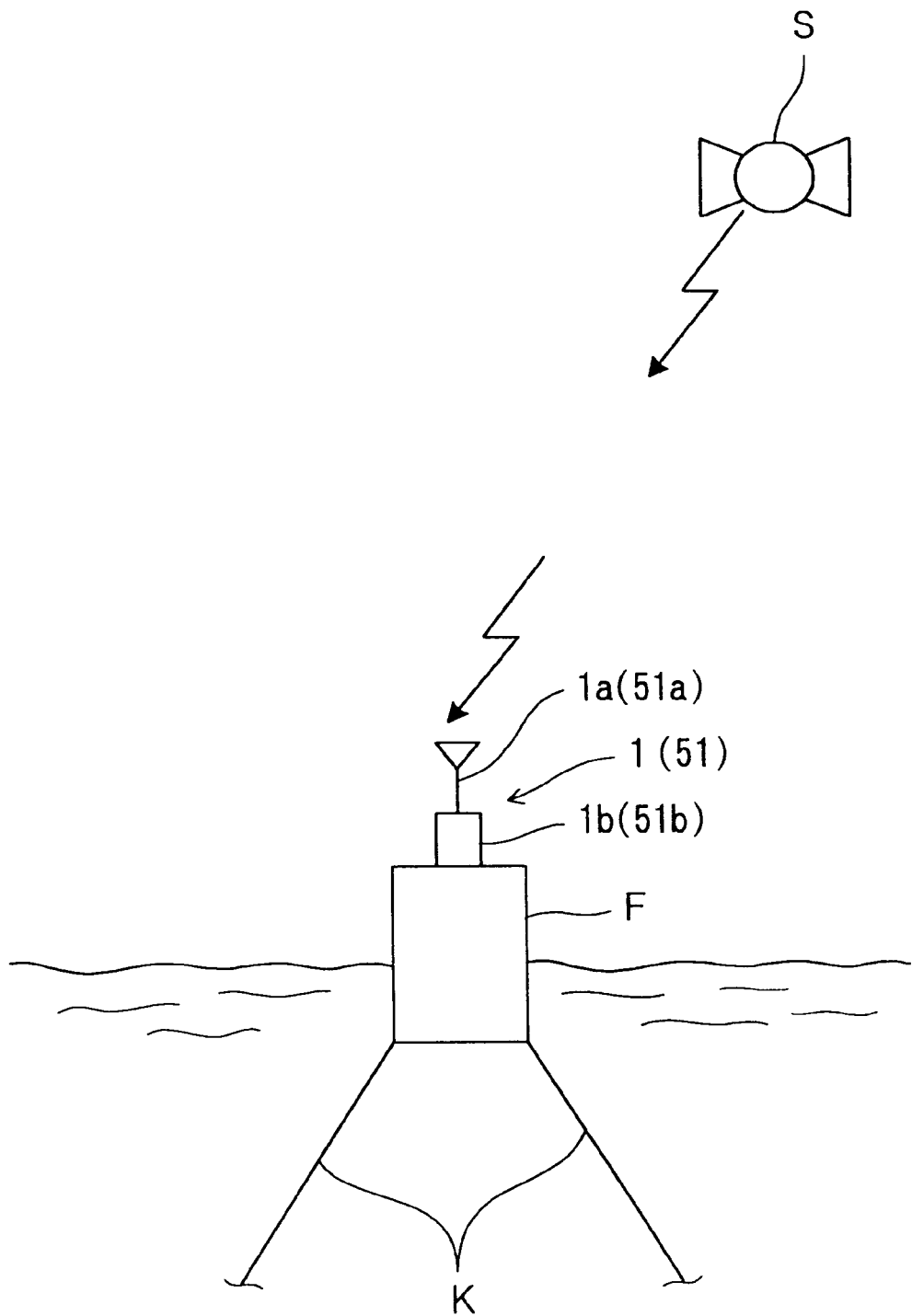
FIG. 1 is a diagram showing a general entire configuration of a displacement measuring apparatus according to a first embodiment of the present invention.

First, a general entire configuration of the displacement measuring apparatus will be described based on the general view in FIG. 1 and the block diagram in FIG. 2.

This displacement measuring apparatus comprises a GPS receiver (comprising a receive antenna 1a and a receiver main body 1b) 1 installed in a floating body F moored at a predetermined position on the sea surface by means of, for example, a mooring rope K, a distance measuring section 2 installed in the GPS receiver 1 for measuring a distance to a GPS satellite (hereafter simply referred to as a "satellite") S, a variance detecting section 3 for subtracting an orbital distance to a satellite orbit from the distance data measured by the distance measuring section 2 to determine a variance of the GPS receiver 1, a disturbance effect-removing section 4 for receiving an input of the variance data obtained by the variance detecting section 3, and removing the effect of wind waves, and a displacement calculating section 5 for receiving an input of the variance [the magnitude of a variation vector of the GPS receiver 1 relative to the satellite (this vector is obtained by mapping a true variation vector corresponding to actual movement of the GPS receiver 1, to a direction vector relative to the satellite)] to determine variation component quantities in three-dimensional coordinate axis directions of the GPS receiver 1, that is, the x, y, and z axes thereof, the variation component quantities corresponding to the displacement of the GPS receiver 1.

Next, each of the above components will be described in detail with the displacement measuring method.

The distance measuring section 2 counts carriers for electric waves from a predetermined satellite which are received by the GPS receiver 1, to measure a distance (a carrier phase) between the predetermined distance and the GPS receiver (precisely speaking, this is a distance to a receive antenna 1a, but the following description refers to the distance to the GPS satellite).

Figure 3:
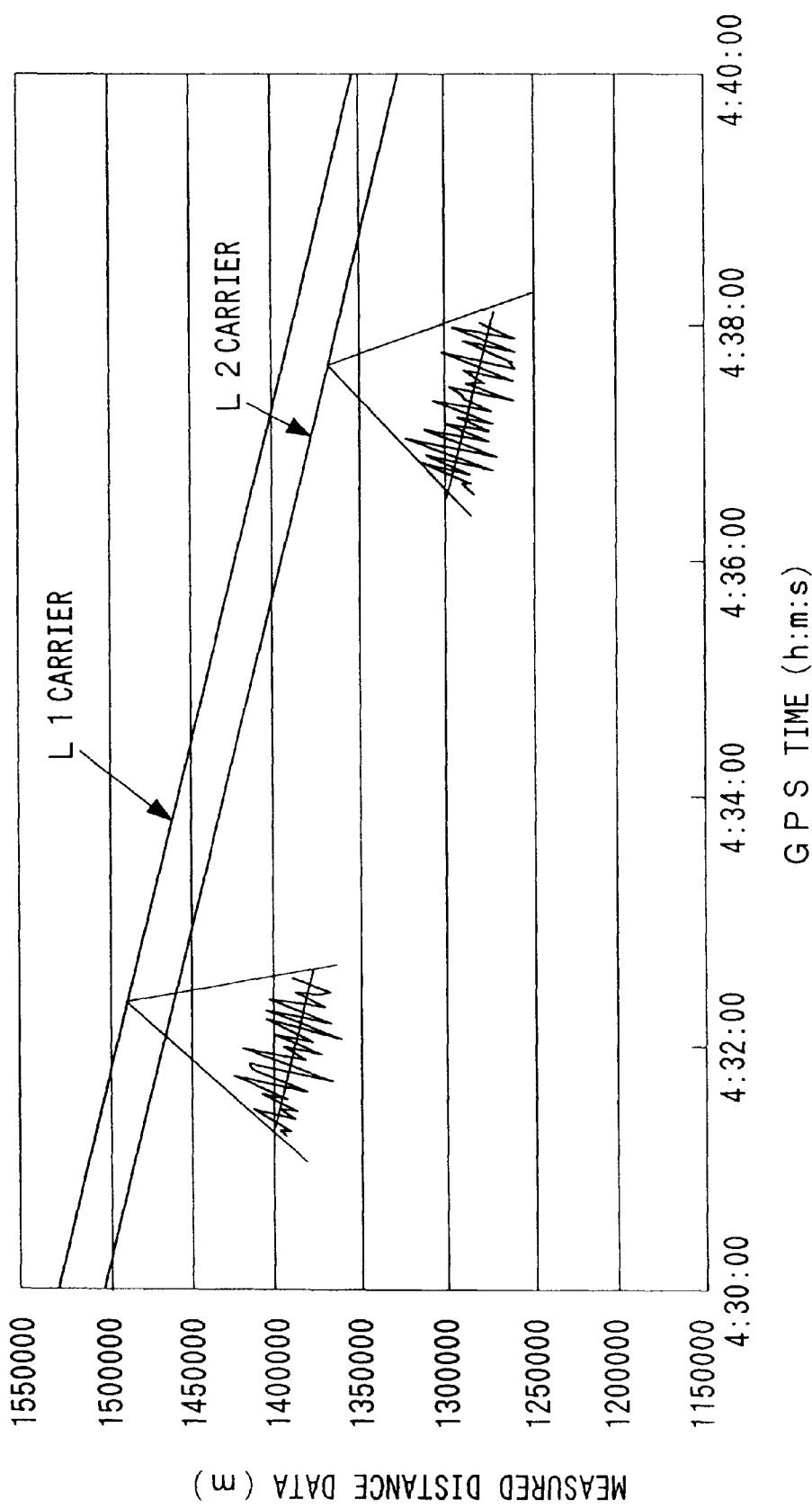
FIG. 3 is a waveform diagram showing measured distance data in a displacement measuring method according to the first embodiment of the present invention.

FIG. 3 shows a waveform of measured distance data measured by the GPS receiver 1. The measured distance data has superposed thereon phase variations caused by wind waves. In addition, although FIG. 3 shows an L1 carrier and an L2 carrier, either of them can be used and other signals contained in the L1 carrier can also be used.

The variance detecting section 3 comprises a moving averaging process section 11 for receiving an input of the measured distance data obtained by the distance measuring section 1, to take an average of movements of several tens of samples in order to obtain distance data corresponding to satellite orbit distance, and a variance calculating section 12 for subtracting from the original measured distance data, the averaged distance data obtained by the moving averaging process section 11, that is, the satellite orbit distance to determine the variance of the GPS receiver 1 relative to the satellite.

Figure 4:
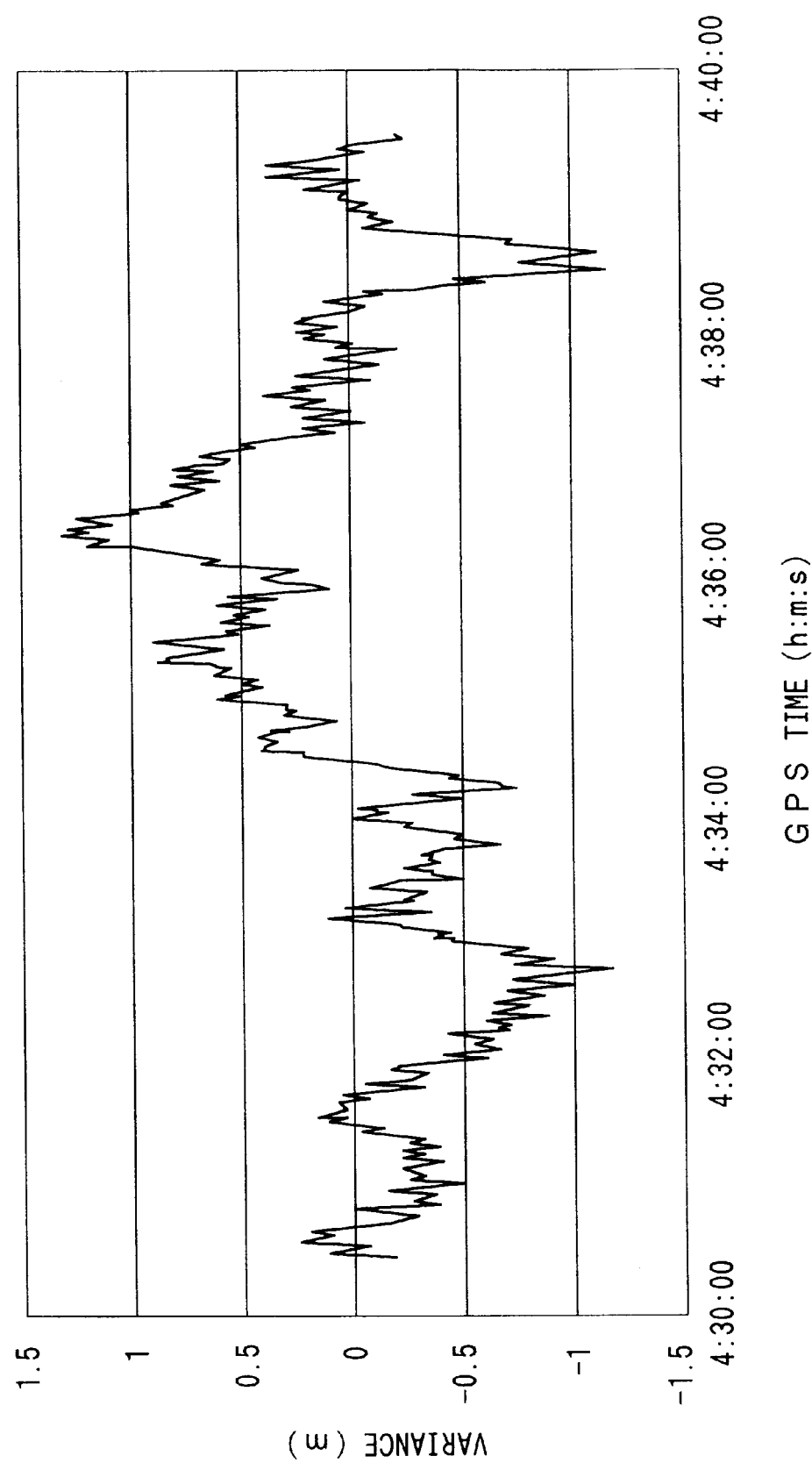
FIG. 4 is a waveform diagram showing variance in the displacement measuring method according to the first embodiment of the present invention.

FIG. 4 shows a waveform of the variance obtained by the variance calculating section 12, that is, a waveform of a variation state of the GPS receiver 1. Variations of this variance having a low frequency represent noise arising from fluctuations in a clock in the GPS receiver 1 or the like, while variations at a high frequency represent variations in the GPS receiver 1, that is, the floating body caused by wind waves.

Figure 5:
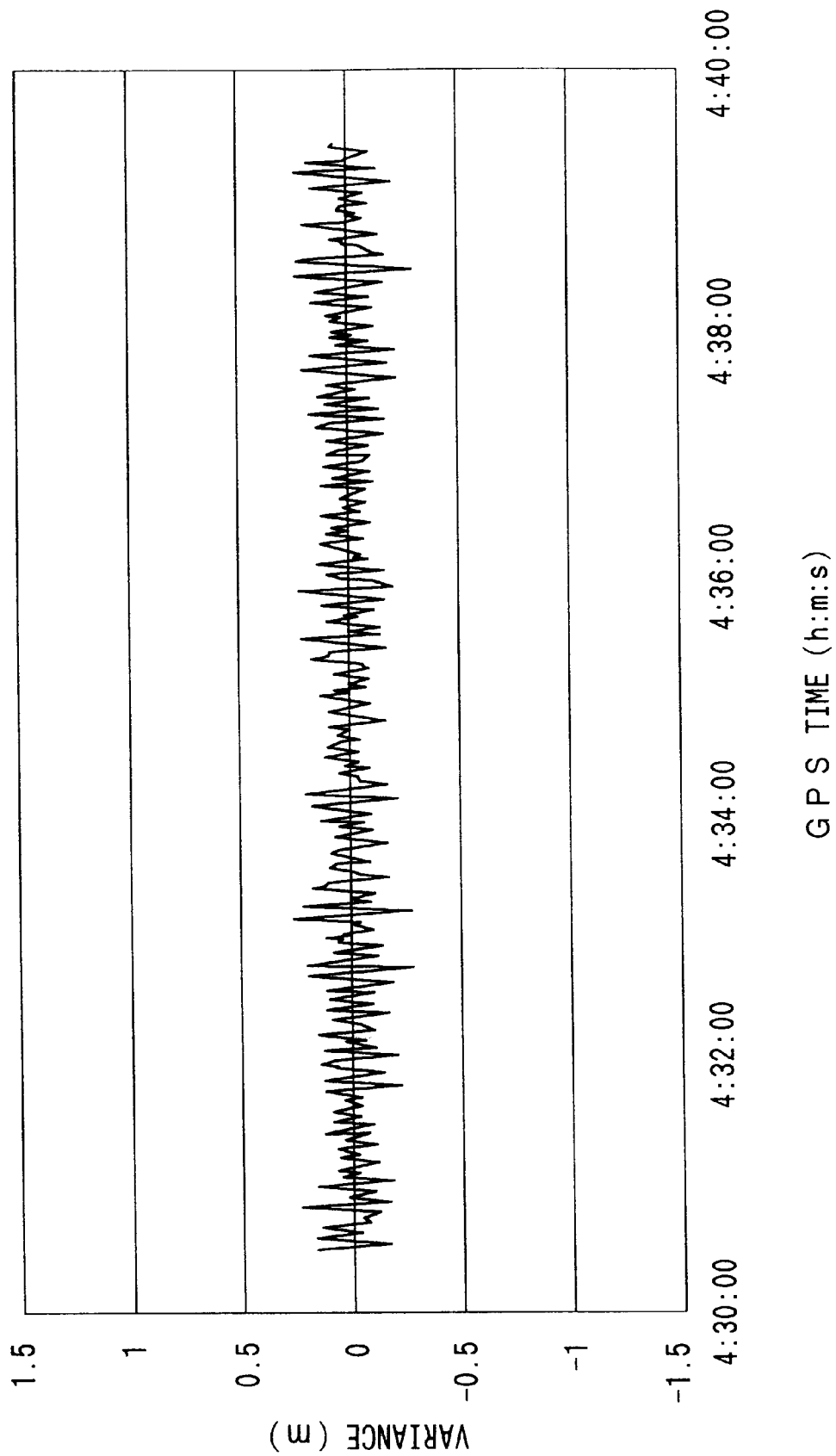
FIG. 5 is a waveform diagram showing variance in the displacement measuring method according to the first embodiment of the present invention.

The disturbance effect-removing section 4 removes wind wave-induced variations by passing an input through a bandpass filter that cuts frequency components corresponding to wind waves. FIG. 5 shows a waveform obtained by means of passage through the bandpass filter.

The displacement calculating section 5 creates three linear equations that use three-dimensional coordinates of the GPS receiver 1, based on each variance free from disturbances which has been obtained based on measured distance data from three satellites and on an azimuth and an elevation of each satellite, and solves ternary linear simultaneous equations to determine variation component quantities of the GPS receiver 1 at three-dimensional coordinates, that is, displacement (X, Y, Z).

Specifically, using the three-dimensional coordinate components (x, y, z), a variance $P_n$ obtained from a carrier from a satellite n is expressed by:

$$P_n = a_n x + b_n y + c_n z \tag{1}$$

where:
$a_n = \cos(El_n)\sin(Az_n)$
$b_n = \cos(El_n)\sin(Az_n)$
$c_n = \sin(Az_n)$
and $Az_n$ and $El_n$ denote the azimuth and elevation of an n-th satellite.

Consequently, three satellites (n=1, 2, 3) are used to obtain the ternary linear simultaneous equations shown by Equation (2), shown below. By solving these simultaneous equations, the displacement of the GPS receiver 1 can be determined.

$$\left.\begin{array}{l} P_1 = a_1 x + b_1 y + c_1 z \\ P_2 = a_2 x + b_2 y + c_2 z \\ P_3 = a_3 x + b_3 y + c_3 z \end{array}\right\} \quad (2)$$

Figure 6:
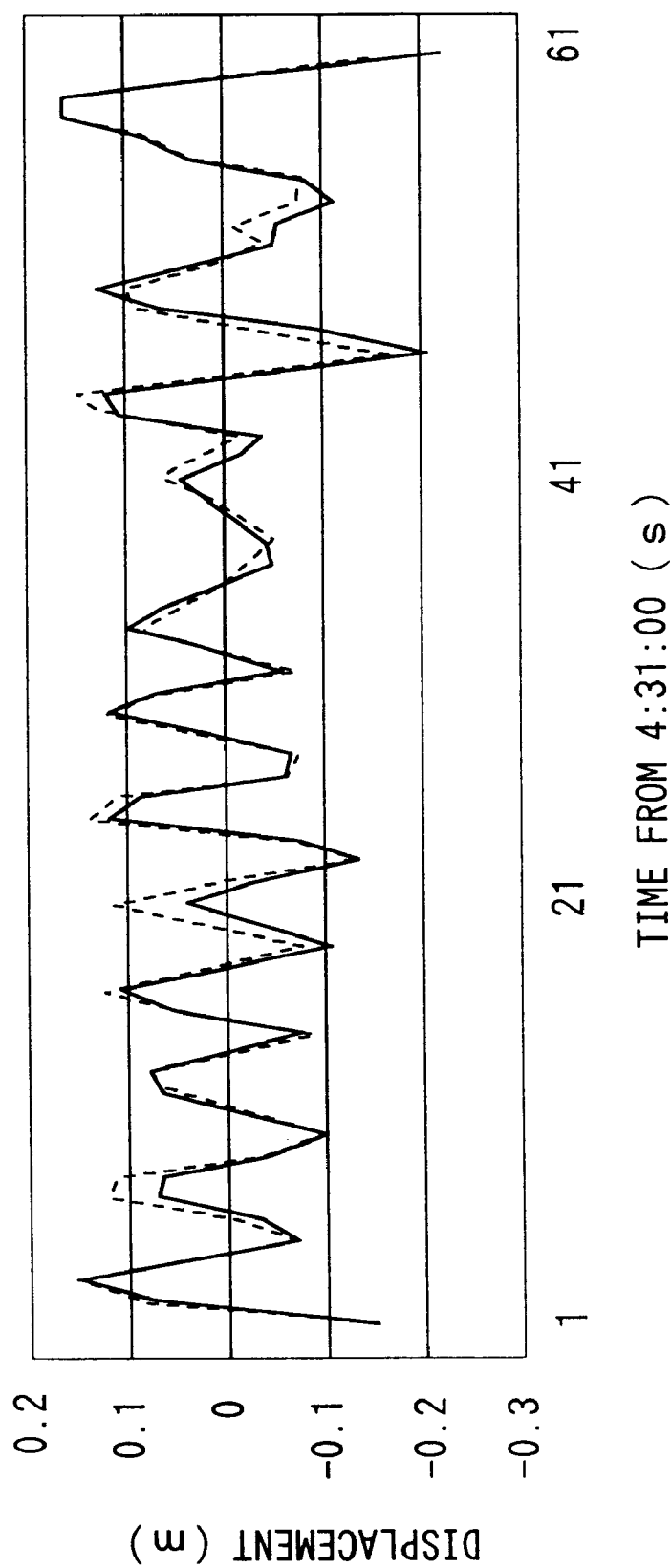
FIG. 6 is a waveform diagram showing displacement in the displacement measuring method according to the first embodiment of the present invention.

A displacement in the z axis direction obtained by solving the simultaneous equations in Equation (2) is shown in FIG. 6 by a solid line. For comparison, a result of measurement based on the real-time kinematic (RTK) method is shown by a broken line. The two lines align substantially, indicating that the accuracy of measurements based on the above described single-point positioning method is almost as high as that based on the relative positioning method.

Of course, displacements X and Y are determined in the x- y-, and z-directions, respectively, so that these displacements X, Y, and Z can be used to measure a tsunami. The conditions of a surge can simply be measured based on the displacement in the z axis direction.

In this manner, the distance between the satellite and the GPS receiver installed in the floating body is measured, and data on the distance to the satellite orbit which is obtained by averaging the measured distance data is subtracted from the above measured distance data to determine the variance of the GPS receiver. Furthermore, this variance is passed through the bandpass filter to remove therefrom wind wave-induced noise, and ternary linear simultaneous equations are created using variances relative to, for example, three satellites and the azimuth and elevation of each of the satellites. Finally, the ternary linear simultaneous equations are solved. Consequently, the displacement of the floating body with the GPS receiver 1 installed therein can be determined precisely, thereby accurately determining the occurrence and magnitude of a tsunami as well as the conditions of a surge.

That is, the above described displacement measuring method and apparatus can precisely measure the displacement of the floating body while reducing measurement costs because the reference point is not required in contrast to the kinematic positioning and because a large amount of measured data need not be transmitted to the land reference point for analysis with data in the reference point.

Variations of the first embodiment will be described below.

Although in the above first embodiment, the variance detecting section 3 determines the satellite orbit by subjecting the measured distance data to the moving averaging process, for example, data on the satellite orbit itself can be used instead.

Figure 2:
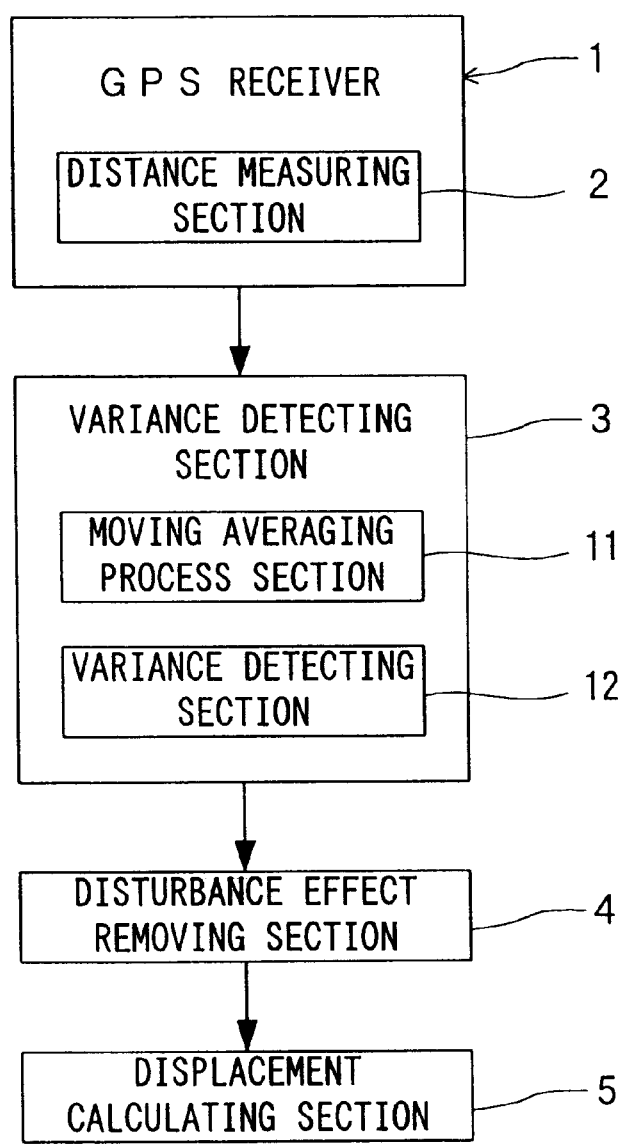
FIG. 2 is a block diagram showing a general configuration of the displacement measuring apparatus according to the first embodiment of the present invention.
Figure 7:
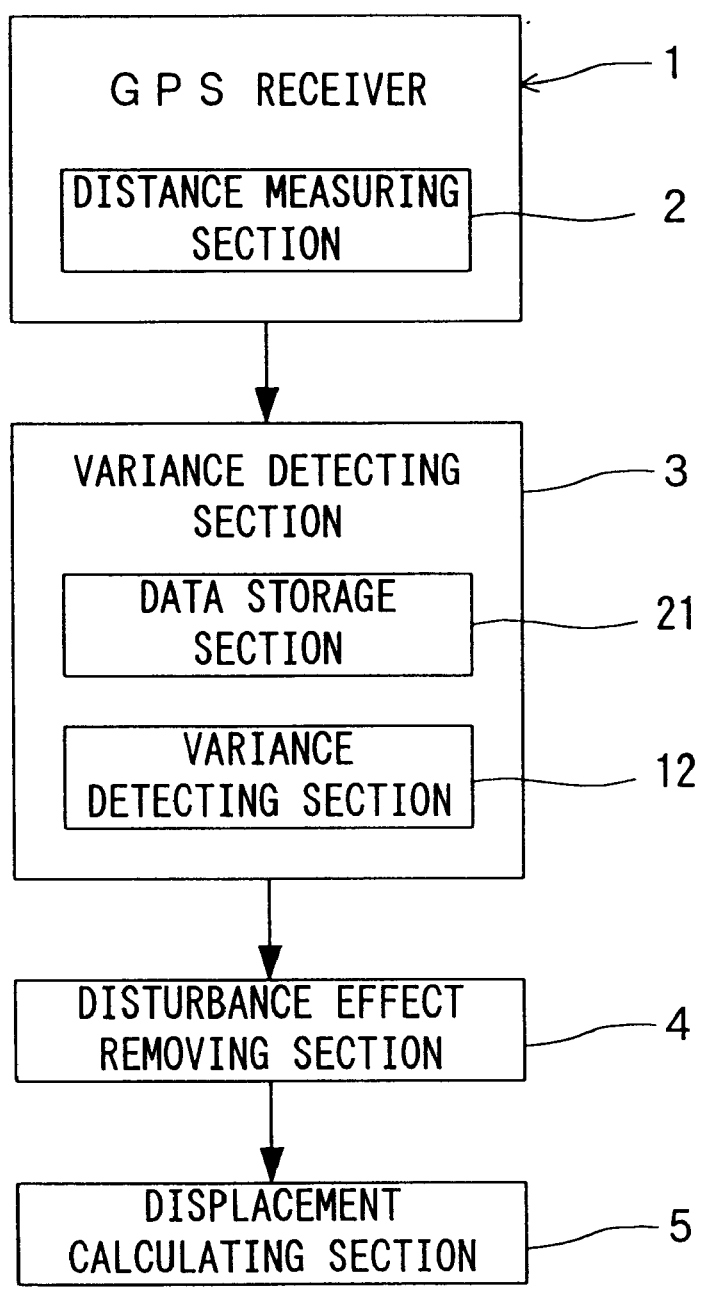
FIG. 7 is a diagram showing a general entire configuration of a displacement measuring apparatus according to a variation of the first embodiment.

In this case, in place of the moving averaging section 11 shown in the block diagram in FIG. 2, a data storage section 21 for storing satellite orbit data is provided as shown in FIG. 7 so that satellite orbit data from the data storage section 21 can be used to calculate variances.

In addition, in the first embodiment, the variance detecting section 3 first determines the orbit of the satellite and then subtracts the satellite orbit data from the measured distance data to determine the variance of the GPS receiver 1. The variance, however, can also be determined within a signal process by, for example, passing the measured distance data through a high pass filter to remove therefrom components that are approximate to the satellite orbit data and that are similar to a direct current. Specifically, those components that are similar to a direct current are removed by fast Fourier transformation, band cutting, or inverse fast Fourier transformation.

Figure 8:
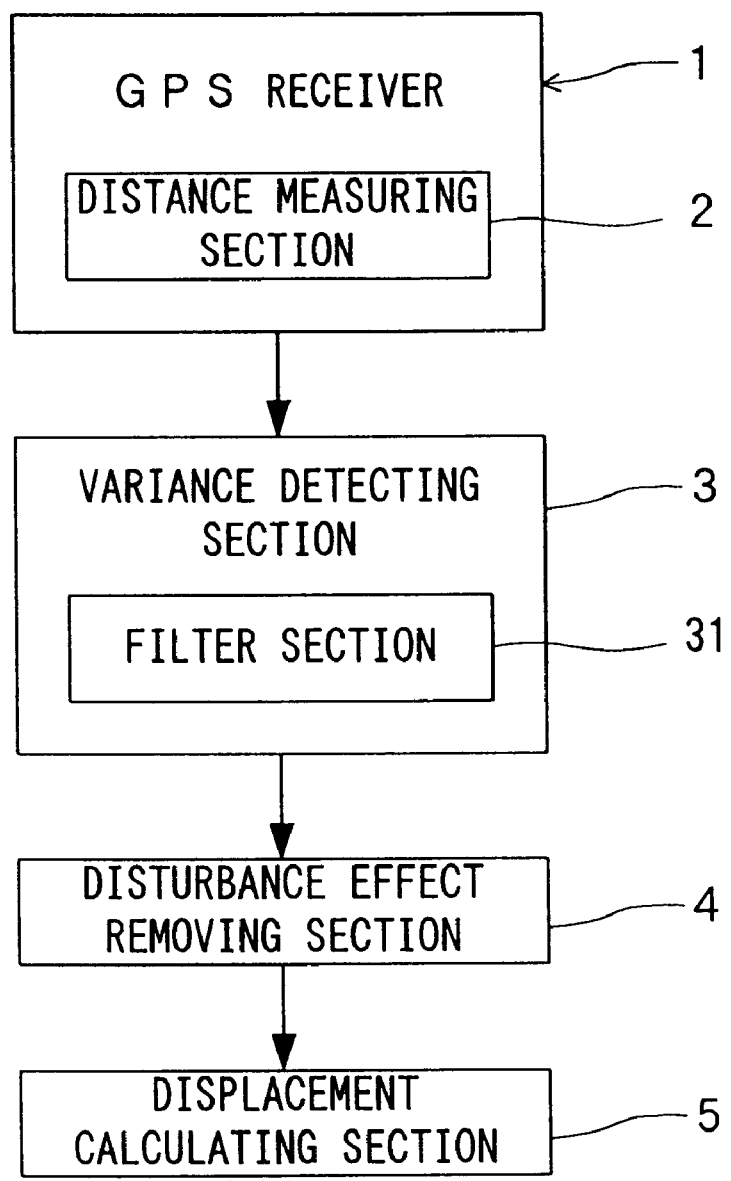
FIG. 8 is a diagram showing a general entire configuration of a displacement measuring apparatus according to a variation of the first embodiment.

In this case, in place of the moving averaging process section 11 and variance calculating section 12 shown in the block diagram in FIG. 2, a filter section 31 comprising a high pass filter is used as shown in FIG. 8.

In addition, although in the first embodiment, the variance detecting section 3 determines the variance of the GPS receiver 1 and the disturbance effect-removing section 4 removes the effect of wind waves, a variance free from the effect of wind waves can be obtained by, for example, subjecting the measured distance data obtained by the distance measuring section 2, to a moving averaging process based on a time window larger than or equal to (for example, about 11 seconds) a wave period (an example of a wave period in the measurement environment) to obtain distance data corresponding to the satellite orbit distance, and subtracting from the original measured distance data the averaged distance data obtained through this moving averaging process based on the time window. That is, this moving averaging process based on the time window eliminates the needs for the configuration for removing the effect of disturbances (the disturbance effect-removing section).

Figure 9:
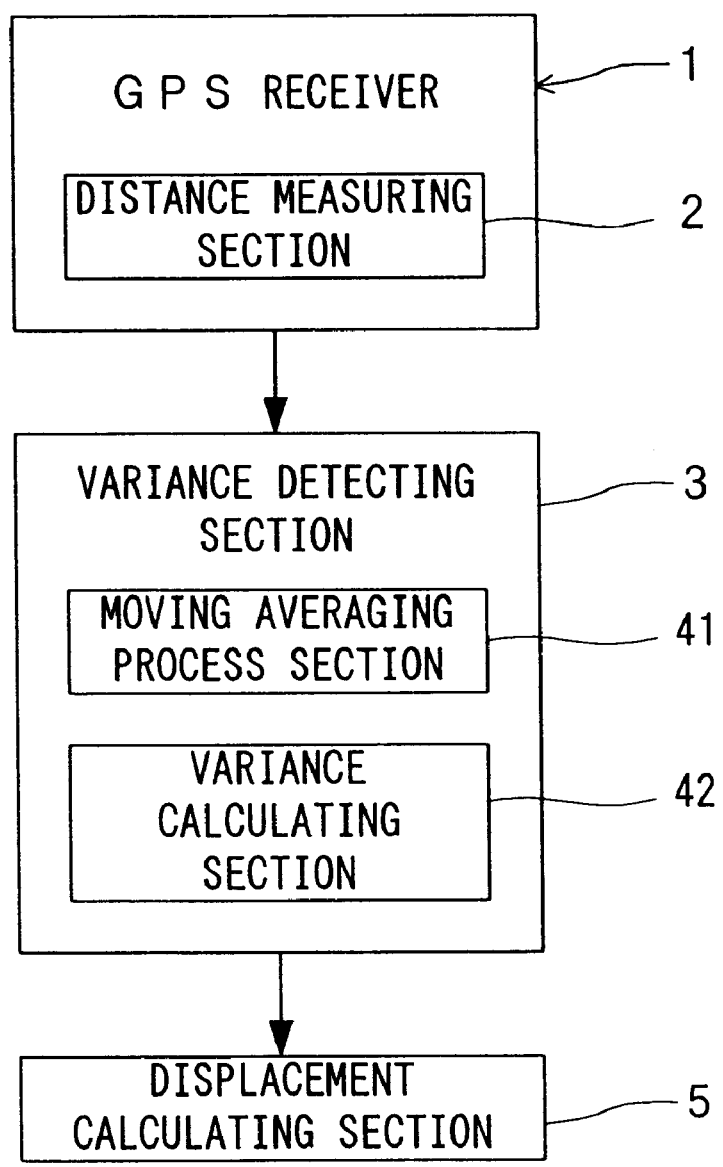
FIG. 9 is a diagram showing a general entire configuration of a displacement measuring apparatus according to a variation of the first embodiment.

In this case, as shown in FIG. 9, the disturbance effect removing section 4 shown in the block diagram in FIG. 2 is removed, a moving averaging process section 41 carries out the moving averaging process based on the time window, and a variance calculating section 42 subtracts the averaged distance data from the measured distance data and inputs the result directly to the displacement calculating section 5.

In addition, in the description of the first embodiment and each of the above described variances, the displacement calculating section 5 uses the variances obtained from the three satellites to determine the displacements in the x-, y-, and z-axis directions of the GPS receiver. However, variances obtained from, for example, four or more (n) satellites can also be used.

In this case, as shown in Equation (3), shown below, equations are created for n variances $P_n$ so that the least square method can be applied to obtain more reliable displacements, as shown in Equations (4) and (5), shown below.

$$\left.\begin{array}{l} P_1 = a_1 x + b_1 y + c_1 z \\ P_2 = a_2 x + b_2 y + c_2 z \\ \vdots \\ P_n = a_n x + b_n y + c_n z \\ \vdots \\ P_N = a_N x + b_N y + c_N z \end{array}\right\} \quad (3)$$

in the case of n=1, 2, . . . , N $$\left.\begin{array}{l} O = \frac{\partial}{\partial x} \sum_{n=1}^{N} (a_n x + b_n y + c_n z - P_n)^2 \\ = 2\left[\left(\sum_{n=1}^{N} a_n^2\right)x + \left(\sum_{n=1}^{N} b_n a_n\right)y + \left(\sum_{n=1}^{N} c_n a_n\right)z - \left(\sum_{n=1}^{N} P_n a_n\right)\right] \\ O = \frac{\partial}{\partial y} \sum_{n=1}^{N} (a_n x + b_n y + c_n z - P_n)^2 \\ = 2\left[\left(\sum_{n=1}^{N} a_n b_n\right)x + \left(\sum_{n=1}^{N} b_n^2\right)y + \left(\sum_{n=1}^{N} c_n b_n\right)z - \left(\sum_{n=1}^{N} P_n b_n\right)\right] \\ O = \frac{\partial}{\partial Z} \sum_{n=1}^{N} (a_n x + b_n y + c_n z - P_n)^2 \\ = 2\left[\left(\sum_{n=1}^{N} a_n c_n\right)x + \left(\sum_{n=1}^{N} b_n c_n\right)y + \left(\sum_{n=1}^{N} c_n^2\right)z - \left(\sum_{n=1}^{N} P_n c_n\right)\right] \end{array}\right\} \quad (4)$$

$$\sum_{n=1}^{N} P_n a_n = \left(\sum_{n=1}^{N} a_n^2\right)x + \left(\sum_{n=1}^{N} b_n a_n\right)y + \left(\sum_{n=1}^{N} c_n a_n\right)z \quad (5)$$

$$\sum_{n=1}^{N} P_n b_n = \left(\sum_{n=1}^{N} a_n b_n\right)x + \left(\sum_{n=1}^{N} b_n^2\right)y + \left(\sum_{n=1}^{N} c_n b_n\right)z$$

$$\sum_{n=1}^{N} P_n c_n = \left(\sum_{n=1}^{N} a_n c_n\right)x + \left(\sum_{n=1}^{N} b_n c_n\right)y + \left(\sum_{n=1}^{N} c_n^2\right)z$$

Figure 10:
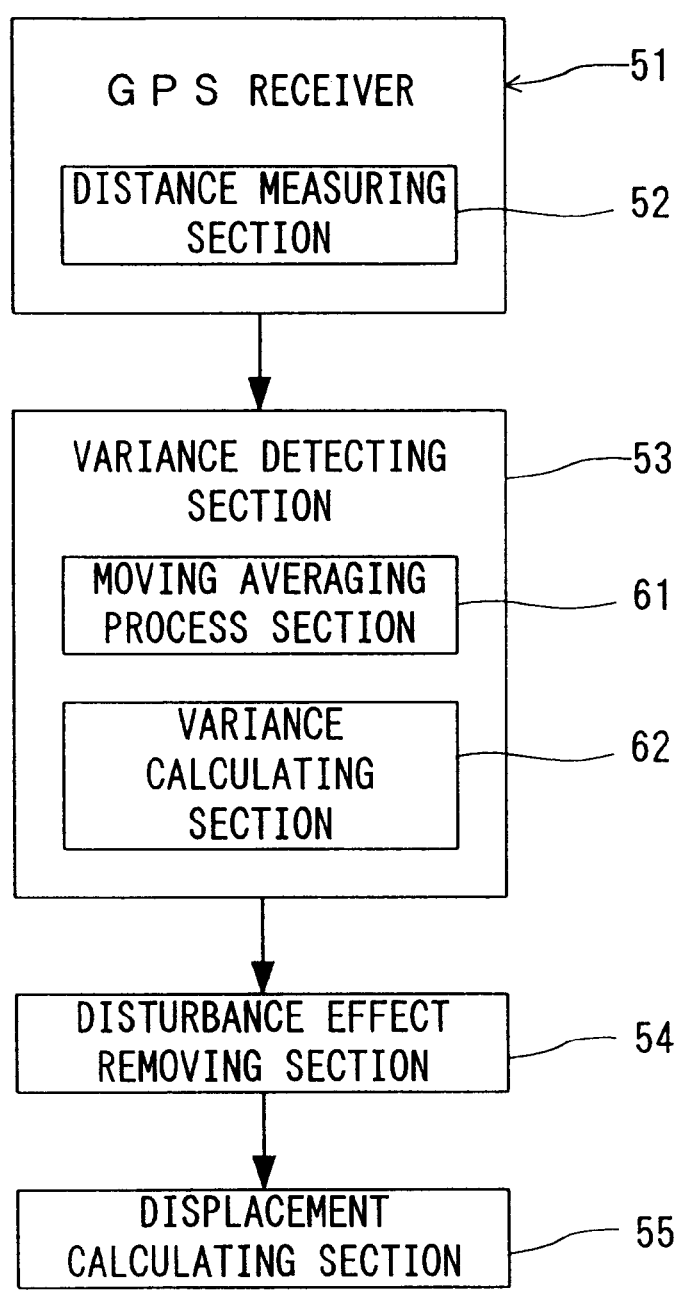
FIG. 10 is a diagram showing a general entire configuration of a displacement measuring apparatus according to a second embodiment of the present invention.

FIG. 10 is a diagram useful in explaining a method and apparatus for measuring displacement of an object using a GPS according to a second preferred embodiment of the present invention.

In the first embodiment, the displacement calculating section creates the ternary linear simultaneous equations using the variances or the like determined from the three satellites. In the second embodiment, a displacement calculating section 55, shown in FIG. 10, determines four linear equations that use three-dimensional coordinates of a GPS receiver 51, based on variances as well as azimuths and elevations determined from at least four satellites, determines differences among the four linear equations to obtain linear equations for three satellite to satellite single phase differences concerning the variance of the GPS receiver, and solves these simultaneous equations to determine displacement of the GPS receiver corresponding to its variation component quantities in the three-dimensional coordinate axis directions.

Since this embodiment has the same basic configuration as the first embodiment, it will be generally explained with reference to FIGS. 1 and 10.

This displacement measuring apparatus comprises a GPS receiver (comprising a receive antenna 51a and a receiver main body 51b) 51 installed in a floating body F moored at a predetermined position on the sea surface by means of, for example, a mooring rope K, a distance measuring section 52 installed in the GPS receiver 51 for measuring a distance to a GPS satellite S, a variance detecting section 53 for subtracting an orbital distance to a satellite orbit from the distance data measured by the distance measuring section 52 to determine a variance of the GPS receiver 51, a disturbance effect-removing section 54 for receiving an input of the variance data obtained by the variance detecting section 53, and removing the effect of wind waves therefrom, and a displacement calculating section 55 for receiving an input of the variance obtained in the disturbance effect-removing section 54 [the magnitude of a variation vector of the GPS receiver 1 relative to the satellite (this vector is obtained by mapping a true variation vector corresponding to actual movement of the GPS receiver 51, to a direction vector relative to the satellite)] to determine variation component quantities in three-dimensional coordinate axis directions of the GPS receiver 51, that is, the x, y, and z axes thereof; the variation component quantities corresponding to the displacement of the GPS receiver 51.

The variance detecting section 53 comprises a moving averaging process section 61 for receiving an input of the measured distance data obtained by the distance measuring section 52, to take an average of movements of several tens of samples in order to obtain distance data corresponding to satellite orbit distances, and a variance calculating section 62 for subtracting from the original measured distance data, the averaged distance data obtained by the moving averaging process section 61, that is, the satellite orbit distance to determine the variance of the GPS receiver 51 relative to the satellite.

The displacement calculating section 55 receives an input of the four variances $P_1$ to $P_4$ obtained by the variance detecting section 53 to determine the four linear equations shown in Equation (6), shown below, based on these variances and the azimuth and elevation of the GPS receiver relative to each satellite, and then determines three linear equations based on star-like satellite to satellite single phase differences as shown in Equation (7), shown below.

$$\begin{aligned} P_1 &= a_1 x + b_1 y + c_1 z \\ P_2 &= a_2 x + b_2 y + c_2 z \\ P_3 &= a_3 x + b_3 y + c_3 z \\ P_4 &= a_4 x + b_4 y + c_4 z \end{aligned} \quad (6)$$

$$\begin{aligned} P_1 - P_4 &= (a_1 - a_4)x + (b_1 - b_4)y + (c_1 - c_4)z \\ P_2 - P_4 &= (a_2 - a_4)x + (b_2 - b_4)y + (c_2 - c_4)z \\ P_3 - P_4 &= (a_3 - a_4)x + (b_3 - b_4)y + (c_3 - c_4)z \end{aligned} \quad (7)$$

If cyclic satellite to satellite single phase differences are used, simultaneous equations such as those shown in Equation (8), shown below, are obtained.

$$\begin{aligned} P_1 - P_2 &= (a_1 - a_2)x + (b_1 - b_2)y + (c_1 - c_2)z \\ P_2 - P_3 &= (a_2 - a_3)x + (b_2 - b_3)y + (c_2 - c_3)z \\ P_3 - P_4 &= (a_3 - a_4)x + (b_3 - b_4)y + (c_3 - c_4)z \end{aligned} \quad (8)$$

By solving the simultaneous equations based on the three satellite to satellite single phase differences and concerning the variance of the GPS receiver, the variance of the GPS receiver on the three-dimensional coordinate axes (X, Y, Z) is determined.

If the variance of the GPS receiver is determined based on n satellite to satellite single phase differences, a reliable displacement is obtained using the least square method as shown in Equations (9) and (10), shown below.

$$O = \frac{\partial}{\partial x} \sum_{n=1}^{N} [(a_n - a_N)x + (b_n - b_N)y + (c_n - c_N)z - (P_n - P_N)]^2$$

$$= 2\left[\left(\sum_{n=1}^{N-1}(a_n - a_N)^2\right)x + \left(\sum_{n=1}^{N-1}(b_n - b_N)(a_n - a_N)\right)y + \left(\sum_{n=1}^{N}(c_n - c_N)(a_n - a_N)\right)z\right] - \sum_{n=1}^{N-1}(P_n - P_N)(a_n - a_N)\right]$$

$$O = \frac{\partial}{\partial y} \sum_{n=1}^{N} [(a_n - a_N)x + (b_n - b_N)y + (c_n - c_N)z - (P_n - P_N)]^2$$

$$= 2\left[\sum_{n=1}^{N-1}(a_n - a_N)(b_n - b_N)x + \left(\sum_{n=1}^{N-1}(b_n - b_N)^2\right)y + \left(\sum_{n=1}^{N-1}(c_n - c_N)(b_n - b_N)\right)z - \sum_{n=1}^{N-1}(P_n - P_N)(b_n - b_N)\right]$$

$$O = \frac{\partial}{\partial z} \sum_{n=1}^{N} [(a_n - a_N)x + (b_n - b_N)y + (c_n - c_N)z - (P_n - P_N)]^2$$

$$= 2\left[\left(\sum_{n=1}^{N}(a_n - a_N)(c_n - c_N)\right)x + \left(\sum_{n=1}^{N}(b_n - b_N)(c_n - c_N)\right)y + \left(\sum_{n=1}^{N}(c_n - c_N)^2\right)z - \sum_{n=1}^{N}(P_n - P_N)(c_n - c_N)\right]$$

(9)

$$\sum_{n=1}^{N-1}(P_n - P_N)(a_n - a_N) = \left(\sum_{n=1}^{N-1}(a_n - a_N)^2\right)x + \left(\sum_{n=1}^{N-1}(b_n - b_N)(a_n - a_N)\right)y + \left(\sum_{n=1}^{N}(c_n - c_N)(a_n - a_N)\right)z$$

$$\sum_{n=1}^{N-1}(P_n - P_N)(b_n - b_N) = \left(\sum_{n=1}^{N-1}(a_n - a_N)(b_n - b_N)\right)x + \left(\sum_{n=1}^{N-1}(b_n - b_N)^2\right)y + \left(\sum_{n=1}^{N-1}(c_n - c_N)(b_n - b_N)\right)z$$

$$\sum_{n=1}^{N}(P_n - P_N)(c_n - c_N) = \left(\sum_{n=1}^{N-1}(a_n - a_N)(c_n - c_N)\right)x + \left(\sum_{n=1}^{N}(b_n - b_N)(c_n - c_N)\right)y + \left(\sum_{n=1}^{N}(c_n - c_N)^2\right)z$$

(10)

The displacement measuring method and apparatus according to the second embodiment does not only provide the same effects as the first embodiment but also uses the measured distance data based on the satellite to satellite single phase differences to eliminate the need to remove errors originating from measuring instruments, that is, low frequencies such as fluctuations in the clock of the GPS receiver or the like, thereby simplifying the configuration thereof or the like.

The four variations described in the first embodiment are also applicable to the second embodiment.

That is, in the second embodiment, the variance detecting section 53 determines the satellite orbit by subjecting the measured distance data to the moving averaging process, but for example, the satellite orbit data can also be used directly.

Figure 11:
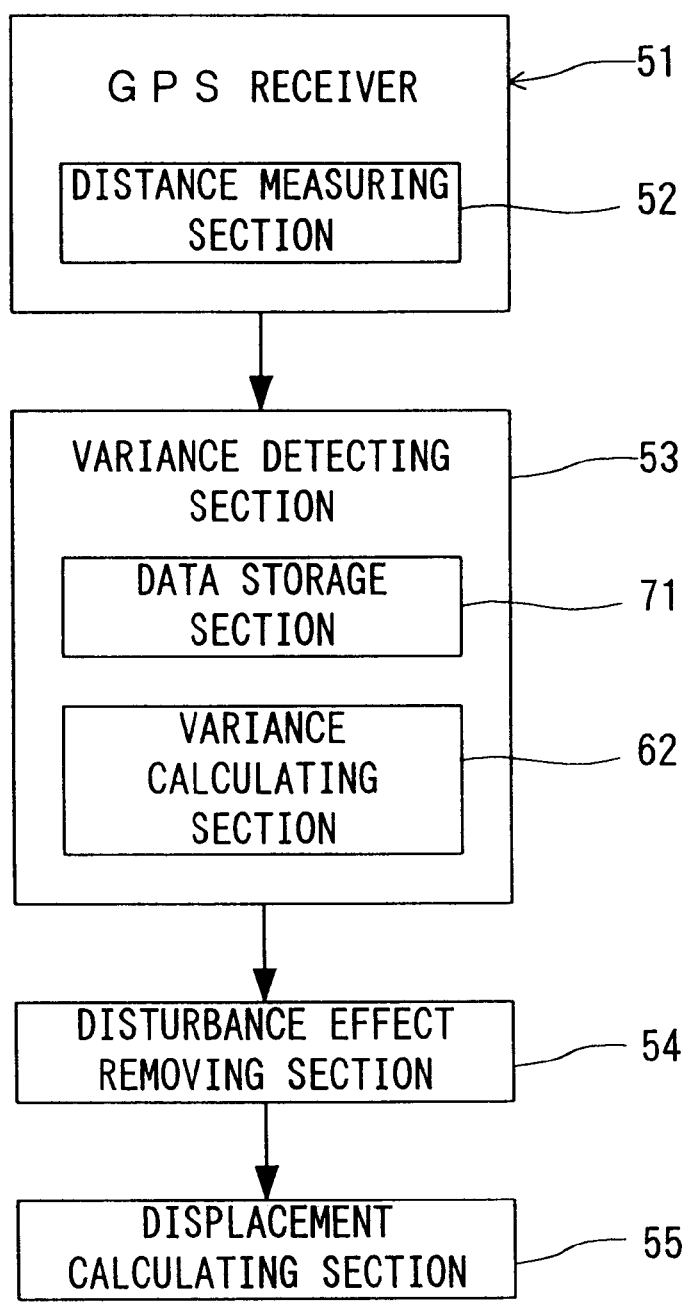
FIG. 11 is a diagram showing a general entire configuration of a displacement measuring apparatus according to a variation of the second embodiment.

In this case, in place of the moving averaging process 51 shown in the block diagram in FIG. 10, a data storage section 71 that stores satellite orbit data is provided as shown in FIG. 11 so that satellite orbit data from the data storage section 71 can be used to calculate the variance.

Additionally, in the second embodiment, the variance detecting section 53 first determines the satellite orbit and subtracts the satellite orbit data from the measured distance data to determine the variance of the GPS receiver 51. The variance, however, can be determined within a single process by, for example, passing the measured distance data through a high pass filter to remove therefrom components that are approximate to the satellite orbit data and that are similar to a direct current. Specifically, those components that are similar to a direct current are removed by fast Fourier transformation, band cutting, or inverse fast Fourier transformation.

Figure 12:
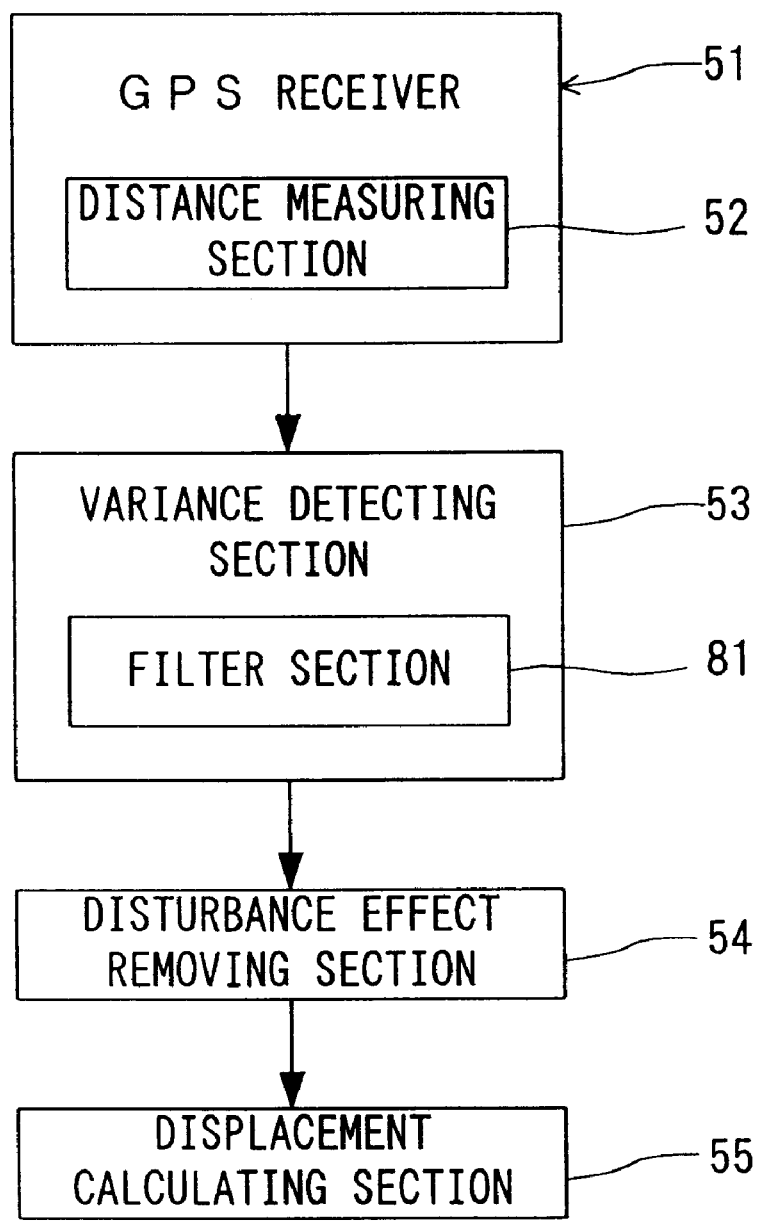
FIG. 12 is a diagram showing a general entire configuration of a displacement measuring apparatus according to a variation of the second embodiment.

In this case, in place of the moving averaging process section 61 and variance calculating section 62 shown in the block diagram in FIG. 10, a filter section 81 comprising a high pass filter is used as shown in FIG. 12.

In addition, although in the second embodiment, the variance detecting section 53 determines the variance of the GPS receiver 51 and the disturbance effect-removing section 54 removes the effect of wind waves, a variance free from the effect of wind waves can be obtained by, for example, subjecting the measured distance data obtained by the distance measuring section 52, to a moving averaging process based on a time window larger than or equal to (for example, about 11 seconds) a wave period (an example of a wave period in the measurement environment) to obtain distance data corresponding to the satellite orbit distance, and subtracting from the original measured distance data the averaged distance data obtained through this moving averaging process based on the time window. That is, this moving averaging process based on the time window eliminates the needs for the configuration for removing the effect of disturbances (the disturbance effect-removing section).

Figure 13:
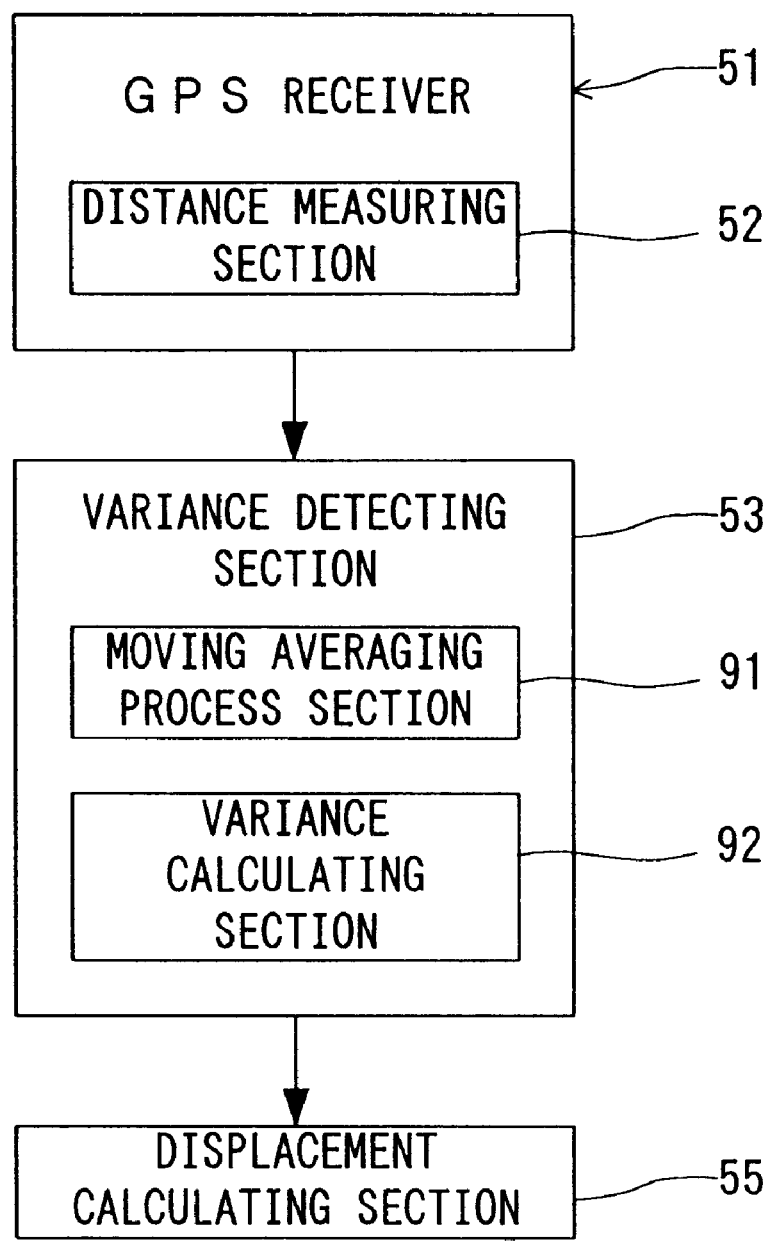
FIG. 13 is a diagram showing a general entire configuration of a displacement measuring apparatus according to a variation of the second embodiment.

In this case, as shown in FIG. 13, the disturbance effect removing section 54 shown in the block diagram in FIG. 10 is removed, a moving averaging process section 91 carries out the moving averaging process based on the time window, and a variance calculating section 92 subtracts the averaged distance data from the measured distance data and inputs the result directly to the displacement calculating section 55.

In addition, in the description of the second embodiment and each variation relating thereto, the displacement calculating section 55 uses the variances obtained from the at least four satellites to obtain equations for the at least three satellite to satellite single phase differences to determine the displacements in the x-, y-, and z-axis directions of the GPS receiver. However, based on variances obtained from, for example, five or more (n) satellites, linear equations for at least four satellite to satellite single phase differences can be used to determine a variance corresponding to the resulting variation components.

In this case, as in the first embodiment, equations are created for n-1 satellite to satellite single phase differences so that the least square method can be applied to obtain more reliable displacements.

The above described displacement measuring method and apparatus according to the first and second embodiments can be used to construct reliable disaster prevention systems and ship navigation support systems, thereby significantly contributing society.

Additionally, although the first and second embodiments have been described in conjunction with measurements of the displacement of the floating body, the present invention is not limited to this. In this case, as the wave period applied to the above described time window, an appropriate cycle for a measured object, for example, a variation cycle in the environment of the measured object may be used.

What is claimed is:

1. A method for measuring displacement of an object using a GPS, comprising the steps of, in measuring displacement of the object on which a GPS receiver is installed:
   measuring a distance between said GPS receiver and a GPS satellite;
   removing from this measured distance data, distance data corresponding to a distance to a satellite orbit to determine a variance of the GPS receiver;
   determining at least three linear equations that use three-dimensional coordinates of the GPS receiver as unknown numbers, based on said variances relative to at least three GPS satellites and an azimuth and an elevation of each GPS satellite; and
   solving these simultaneous equations to determine displacement of the GPS receiver, which corresponds to variation component quantities on three-dimensional coordinate axes in the GPS receiver.

2. The method for measuring displacement of an object using a GPS according to claim 1, wherein the distance data corresponding to the distance to the satellite orbit is obtained by subjecting the measured distance data to a moving averaging process.

3. The method for measuring displacement of an object using a GPS according to claim 1, wherein as the distance data corresponding to the distance to the satellite orbit, satellite orbit data itself is used.

4. The method for measuring displacement of an object using a GPS according to claim 1, wherein the variance of the GPS receiver is obtained by passing the measured distance data through a high pass filter to remove therefrom distance data approximate to the satellite orbit.

5. The method for measuring displacement of an object using a GPS according to claim 1, wherein the variance of the GPS receiver is obtained by subjecting the measured distance data to a moving averaging process based on a time window larger than or equal to a variation cycle in a measurement environment.

6. A method for measuring displacement of an object using a GPS, comprising the steps of, in measuring displacement of the object on which a GPS receiver is installed:
   measuring a distance between said GPS receiver and a GPS satellite;
   removing from this measured distance data, distance data corresponding to a distance to a satellite orbit to determine a variance of the GPS receiver;
   determining at least four linear equations that use three-dimensional coordinates of the GPS receiver as unknown numbers, based on said variances relative to at least four GPS satellites and an azimuth and an elevation of each GPS satellite;
   determining differences among the at least four linear equations to obtain linear equations for at least three satellite to satellite single phase differences concerning the variance of the GPS receiver; and
   solving these simultaneous equations to determine displacement of the GPS receiver, which corresponds to variation component quantities on three-dimensional coordinate axes in the GPS receiver.

7. The method for measuring displacement of an object using a GPS according to claim 6, wherein the distance data corresponding to the distance to the satellite orbit is obtained by subjecting the measured distance data to a moving averaging process.

8. The method for measuring displacement of an object using a GPS according to claim 6, wherein as the distance data corresponding to the distance to the satellite orbit, satellite orbit data itself is used.

9. The method for measuring displacement of an object using a GPS according to claim 6, wherein the variance of the GPS receiver is obtained by passing the measured distance data through a high pass filter to remove therefrom distance data approximate to the satellite orbit.

10. The method for measuring displacement of an object using a GPS according to claim 6, wherein the variance of the GPS receiver is obtained by subjecting the measured distance data to a moving averaging process based on a time window larger than or equal to a variation cycle in a measurement environment.

11. An apparatus for measuring displacement of an object using a GPS, the apparatus measuring displacement of the object on which a GPS receiver is installed, comprising:
   a distance measuring section provided in said GPS receiver to measure distances between the GPS receiver and a GPS satellite;
   a variance detecting section for removing from measured distance data measured by the distance measuring section, distance data corresponding to a distance to a satellite orbit to determine a variance of the GPS receiver; and
   a displacement calculating section for determining at least three linear equations that use three-dimensional coordinates of the GPS receiver as unknown numbers, based on variances relative to at least three GPS satellites determined by the variance detecting section and on an azimuth and an elevation of each GPS satellite and then solving these simultaneous equations to determine displacement of the GPS receiver, which corresponds to variation component quantities on three-dimensional coordinate axes in the GPS receiver.

12. The apparatus for measuring displacement of an object using a GPS according to claim 11, wherein the variance detecting section obtains the distance data corresponding to the distance to the satellite orbit, by subjecting the measured distance data to a moving averaging process.

13. The apparatus for measuring displacement of an object using a GPS according to claim 11, wherein the variance detecting section uses satellite object data itself as the distance data corresponding to the distance to the satellite orbit.

14. The apparatus for measuring displacement of an object using a GPS according to claim 11, wherein the variance detecting section comprises a high pass filter through which the measured distance data is passed to remove therefrom distance data approximate to the satellite orbit.

15. The apparatus for measuring displacement of an object using a GPS according to claim 11, wherein the variance detecting section is configured to obtain the variance of the GPS receiver by subjecting the measured distance data to a moving averaging process based on a time window larger than or equal to a variation cycle in a measurement environment.

16. An apparatus for measuring displacement of an object using a GPS, the apparatus measuring displacement of the object on which a GPS receiver is installed, comprising:

a distance measuring section provided in said GPS receiver to measure distances between the GPS receiver and a GPS satellite;

a variance detecting section for removing from measured distance data measured by the distance measuring section, distance data corresponding to a distance to a satellite orbit to determine a variance of the GPS receiver; and a displacement calculating section for determining at least four linear equations that use three-dimensional coordinates of the GPS receiver as unknown numbers, based on variances relative to at least four GPS satellites determined by the variance detecting section and an azimuth and an elevation of each GPS satellite, determining differences among the at least four linear equations to obtain linear equations for at least three satellite to satellite single phase differences concerning the variance of the GPS receiver, and then solving these simultaneous equations to determine displacement of the GPS receiver, which corresponds to variation component quantities on three-dimensional coordinate axes in the GPS receiver.

17. The apparatus for measuring displacement of an object using a GPS according to claim 16, wherein the variance detecting section obtains the distance data corresponding to the distance to the satellite orbit, by subjecting the measured distance data to a moving averaging process.

18. The apparatus for measuring displacement of an object using a GPS according to claim 16, wherein the variance detecting section uses satellite object data itself as the distance data corresponding to the distance to the satellite orbit.

19. The apparatus for measuring displacement of an object using a GPS according to claim 16, wherein the variance detecting section comprises a high pass filter through which the measured distance data is passed to remove therefrom distance data approximate to the satellite orbit.

20. The apparatus for measuring displacement of an object using a GPS according to claim 16, wherein the variance detecting section is configured to obtain the variance of the GPS receiver by subjecting the measured distance data to a moving averaging process based on a time window larger than or equal to a variation cycle in a measurement environment.

* * * * *